United States Patent [19]

Pollack et al.

[11] Patent Number: 4,833,045

[45] Date of Patent: May 23, 1989

[54] POROUS ELECTRONIC CURRENT COLLECTOR BODIES FOR ELECTROCHEMICAL CELL CONFIGURATIONS

[75] Inventors: William Pollack, Pittsburgh; Philip Reichner, Plum Borough, both of Pa.

[73] Assignee: Westinghouse Electric Corp., Pittsburgh, Pa.

[21] Appl. No.: 130,918

[22] Filed: Dec. 10, 1987

[51] Int. Cl.[4] .......................... H01M 8/10; H01B 1/02
[52] U.S. Cl. ......................................... 429/30; 429/32; 429/31; 252/513
[58] Field of Search .................... 429/30–32; 252/513

[56] References Cited

U.S. PATENT DOCUMENTS

| | | | |
|---|---|---|---|
| 3,513,029 | 5/1970 | Giner et al. | 136/86 |
| 3,702,019 | 11/1972 | Pollack | 136/34 |
| 3,835,514 | 9/1974 | Pollack | 29/419 |
| 3,866,078 | 2/1975 | Normaw et al. | 313/391 X |
| 3,895,960 | 7/1975 | Brown et al. | 136/36 |
| 3,941,719 | 3/1976 | Yoldas | 252/463 |
| 3,944,658 | 3/1976 | Yoldas | 423/626 |
| 4,084,042 | 4/1978 | Ludwig | 429/111 X |
| 4,096,296 | 6/1978 | Gauaione et al. | 427/252 X |
| 4,270,936 | 6/1981 | Mann | 55/523 X |
| 4,395,468 | 7/1983 | Isenberg | 429/31 |
| 4,490,444 | 12/1984 | Isenberg | 429/31 |
| 4,547,437 | 10/1985 | Isenberg et al. | 429/30 |
| 4,598,028 | 7/1986 | Rossung et al. | 429/30 |
| 4,598,467 | 7/1986 | Isenberg et al. | 29/623.5 |
| 4,648,945 | 3/1987 | Isenberg | 204/15 |

*Primary Examiner*—Stephen J. Kalafut
*Attorney, Agent, or Firm*—Daniel P. Cillo

[57] ABSTRACT

A high-temperature, solid electrolyte electrochemical cell configuration is made comprising a plurality of elongated electrochemical cells 1, having inner electrodes 3, outer electrodes 6 and solid electrolyte 4 therebetween, the cells being electronically connected in series and parallel by flexible, porous, fibrous strips 7, where the strips contain flexible, electronically conductive fibers bonded together and coated with a refractory oxide, and where the oxide coating is effective to prevent additional bonding of fibers during electrochemical cell operation at high temperatures.

5 Claims, 1 Drawing Sheet

U.S. Patent
May 23, 1989
4,833,045
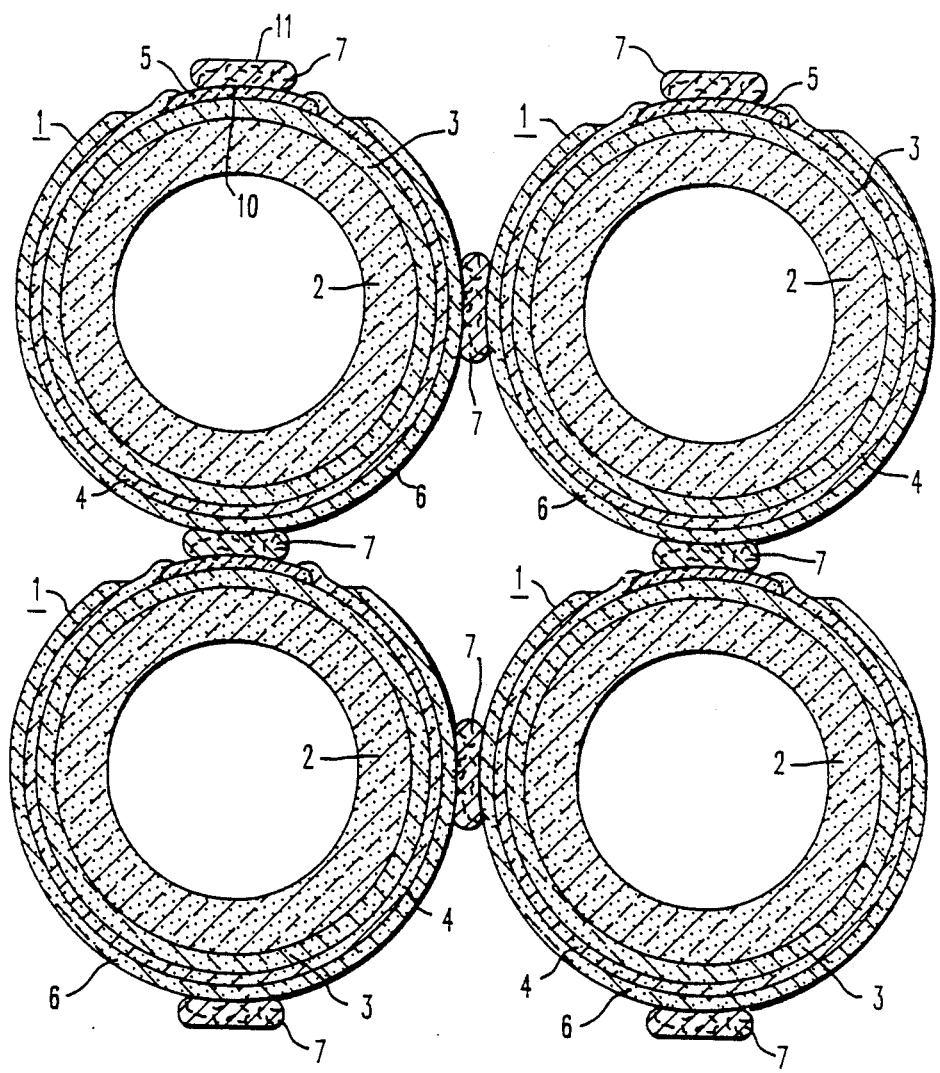

POROUS ELECTRONIC CURRENT COLLECTOR BODIES FOR ELECTROCHEMICAL CELL CONFIGURATIONS

GOVERNMENT CONTRACT

The Government of the United States of America has rights in this invention pursuant to Contract No. DEAC0280-ET17089, awarded by the U.S. Department of Energy.

BACKGROUND OF THE INVENTION

1. Field of the Invention

The present invention relates to high temperature solid oxide electrolyte electrochemical cells and cell configurations and the electronic connection of such cells and configurations.

2. Description of the Prior Art

High temperature, solid oxide elecrtrolyte fuel cell configurations, and fuel cell generators, are well known in the art, and are taught by Isenberg, in U.S. Pat. Nos. 4,395,468 and 4,490,444. These fuel cell configurations comprise a plurality of individual, series and parallel electronically connected, axially elongated, generally tubular, annular cells. Each cell is electronically connected in series to an adjacent cell in a column, through narrow cell connections extending the full axial length of each cell. These connections contact the air electrode of one cell and the fuel electrode of an adjacent cell, through a conductive ceramic interconnection and an uncoated fiber metal felt current collector strip.

The porous felt strip, made for example of interlocking nickel fibers, bonded at contact points, extend axially between the cells. In the preferred embodiment air flows inside the cells and gaseous fuel outside. In the instance of reverse operation, with fuel flowing inside the cells, Isenberg in U.S. Pat. No. 4,490,444, and Isenberg et al. in U.S. Pats. Nos. 4,547,437 and 4,598,467, taught the use of conducting oxide fibers, such as doped $In_2O_3$, as the felt material.

The nickel felt used in the preferred embodiment of the Isenberg patents is about 80% to 97% porous and is generally made according to the teachings of Brown et al., in U.S. Pat. No. 3,895,960, and Pollack, in U.S. Pats. Nos. 3,702,019 and 3,835,514, all involving the use of nickel fibers and matallurigical, diffusion bonding at fiber contact points, at about 900° C. to 1200° C., for use as battery plates.

In another type of fuel cell, involving liquid alkali electrolytes, as taught by Giner et al, in U.S. Pat. No. 3,513,029, a metal bi-porous electrode is used next to the electrolyte. This electrode contains three layers, where the layer contacting the electrolyte acts as an electrolyte barrier layer, and can be either conducting, made from noble metals, especially rhodium, conducting oxides and the like, or, in certain instances, insulating materials, such as cerium oxide, thorium oxide, silica, zirconium oxide, and magnesia oxide. In fuel cells more typical of the type used in this invention, thermally stable oxide fibers, such as yttria stabilized zirconia fibers, calcia stabilized zirconia fibers, alumina fibers, and alumina-silica fibers, have been used to strengthen the interior support structure for the fuel cell, as taught by Rossing et al., in U.S. Pat. No. 4,598,028.

In the preferred, high temperature, solid oxide elecrtrolyte fuel cells taught by the Isenberg patents, the low density, nickel-fiber felt strips which connect adjacent cells also provide the needed flexibility to conform to the cylindrical cell surface and to accommodate thermally-induced relative displacements of the cells, without losing electrical contact and without excessive mechanical loading of the cells. In the assembly operation, the nickel-fiber felt is compressed from its original inter-diffusion bonded thickness of over 0.95 cm. (⅜ inch) to 0.16 cm. (1/16 inch). In this compression many of the nickel fibers are deformed or bent and thereby form new contacts with other fibers.

In operation at 1000° C. the metal of these new fiber contacts will undergo diffusion and form new bonds in the fiber structure. These newly formed fiber bonds increase the rigidity of the fiber metal felt. Because of the increase in the number of fiber bonds, the fiber structure may lose its flexibility to the point where it will not be capable of maintaining an electrical connection between the cells during thermal transients. The increase in stiffness of the felt strips increases the forces applied to the cell electrodes.

Some problems associated with nickel felt strip adherence to the fuel cell interconnections was solved by electrochemical deposition of nickel metal on the non-porous, ceramic interconnection as taught by Isenberg in U.S. Pat. No. 4,648,945. This procedure, however, did not solve problems of stiffness and excess bonding in the nickel felt strip itself.

OBJECT OF THE INVENTION

It is an object of this invention to provide a new type of fiber metal felt body or strip for use between solid oxide electrolyte fuel cells, which will be heat and time stable and which will not increase shear and transverse loading on the fuel cell components during fuel cell generator operation at about 1000° C.

SUMMARY OF THE INVENTION

The above needs and object have been met by the present invention, which in its broadest aspect provides a porous fibrous body, comprising flexible, electronically conductive fibers coated with a refractory oxide. More specifically, this invention provides a high-temperature stable, electronically conductive interlocking fibrous body, having two cell contacting sides, where the fibrous body contains metal fibers selected from the group consisting of flexible, conducting nickel fibers or cobalt fibers, preferably nickel fibers, where the fibers are coated with a refractory oxide. Fibers made of all refractory oxide, having a melting point over 1500° C., may be added to the pre-sintered felt of coated metal fibers. The resultant fibrous body must be electronically conductive. A major portion of the fibrous body must contain refractory oxide coated nickel or cobalt fibers, and, both electrochemical cell contacting sides must have an exposed metallic surface free of oxide. These fibrous strips are used to electronically connect electrochemical cells in a high temperature solid electrolyte electrochemical cell configuration.

In a preferred embodiment, solid nickel fibers, would be felted or laid down, by any appropriate method, to provide an 80% to 98% porous, interlocking fibrous body. This fibrous nickel body would then be metallurgically diffusion bonded at fiber contact points, to provide strength and structural integrity, and thereby provide a bonded strip that could be handled. The bonded, conductive, body would then be coated with, aluminum oxide, zirconium oxide or magnesium oxide on all fiber surfaces, by any suitable means, for example, electrophoretic deposition or application of powder or conversion coating from a liquid suspension through dipping or spraying.

The bonded, porous, fibrous, coated body would then be cut into strips, and prepared to provide two exposed, exterior, opposite nickel sides free of oxide, providing two fuel cell contacting sides. Exposed metallic surfaces of the two sides of the fibrous felt needed to contact the fuel cell could be achieved by laser machining after coating with refractory oxide, by abrading the surfaces, or by masking the metal felt surfaces to be bonded prior to oxide coating. The prepared felt strip could then be applied to the cells, to provide cell combinations.

Thus, the refratory oxide coated strip would be disposed between the cells in an electrochemical cell configuration as electronic, conductors, current collectors, and support elements. In a less preferred embodiment, the bonded, porous fibrous nickel strip could be applied to its proper position between fuel cells in a fuel cell bundle, and then the strip could be coated with refractory oxide after appropriate masking of the other fuel cell components. In all instances, the cell bundles can be inserted into the generator section of a fuel cell generator, such as that shown in U.S. Pat. No. 4,395,468.

Bonded strips, made in this fashion, provide excellent electronic conductivity between the conductive ceramic interconnection material and fuel electrodes, and between fuel electrodes of adjacent fuel cells, along with long-life support stability for the fuel cell bundle. After long term fuel cell generator operation and cycling between 25° C. and 1100° C., the fibrous strips of this invention remain flexible and highly electronically conductive, with minimal additional sintering of fibers, and with minimal separation from other cell components.

BRIEF DESCRIPTION OF THE DRAWINGS

The invention will become more readily apparent from the following description of preferred embodiments thereof shown, by way of example only, in the accompanying drawing, which is a cross-sectional view of one embodiment of a configuration of four electrochemical cell combinations, each having inner and outer electrodes with electrolyte therebetween, connected in parallel and in series by the porous, supporting, electronic connection strips of this invention.

DESCRIPTION OF THE PREFERRED EMBODIMENTS

Referring now to the drawing, one embodiment of part of an electrochemical cell bundle configuration is shown. The cells 1, preferably fuel cells, consist of an optional, porous, ceramic support tube 2, generally of calcia stabilized zirconia, covered by a porous air electrode 3, about 500 microns to 1500 microns thick, comprised, for example, of doped or undoped oxides or mixtures of oxides in the perovskite family, such as, $LaMnO_3$, $CaMnO_3$, $LaNiP_3$, $LaCoO_3$ and $LaCrO_3$. In many instances, if the air electrode is strengthened, the support tube can be eliminated. A portion of the air electrode is covered with a layer of solid, non-porous, ceramic elctrolyte 4, about 50 microns to 100 microns thick, such as yttria stabilized zirconia. The remaining portion of the air electrode is covered with a non-porous, ceramic, interconnection material 5, such as a calcium, strontium or magnesium oxide doped lanthanum chromite film, about 10 microns to about 100 microns thick. Porous fuel electrode material 6, such as nickel-zirconia cermet, about 100 microns thick, covers the electrolyte.

The ceramic interconnection 5 may have a metallic coating, for example nickel or cobalt, up to about 10 microns thick deposited on it, in turn covered with a thin layer of fuel electrode material (neither shown in the Drawing) to improve contact with the electronically conductive, porous, conductor felt strip 7, which is disposed on top of it. Such porous, conductive strips 7 provide series connection from the ceramic interconnection 5 of one fuel cell to the fuel electrode 6 of an adjcent fuel cell. Such porous strips can also be used to provide parallel connection between fuel electrodes 6 of adjacent fuel cells. As can be seen, these porous, electronically conductive strips 7 provide both an electron transferring and fuel cell support function. While the fuel cells 1 shown are of circular cross section, other annular geometries, such as a square or flattened design, may be used.

In operation, an oxygen containing gas is fed through the inside of the porous support tube 2, so that oxygen gas permeates the support and air electrode. A second gas, containing a fuel, for example, carbon monoxide, hydrogen, or their mixtures, is passed over the porous fuel electrode 6 on the outside of and between the fuel cells 1. When the oxygen migrates as an ion through the electrolyte it reacts with the fuel permeating the porous fuel electrode, generating heat and electricity. Additional details regarding fuel cell component materials, electronic connections between the fuel cells, and operation of the fuel cells can be found in U.S. Pats. Nos. 4,395,468; 4,490,444 and 4,648,945, herein incorporated by reference.

The finished, fibrous strip current collector bodies 7 are high-temperature stable. By "high-temperature stable" is meant that the fibrous strips contain fibers or other materials that have melting points over 1100° C. These strips have two fuel cell contacting sides 10 and 1 which must be free of oxide. The finished strips 7 are from 80% to 95% porous (5% to 20% of theoretical density) as shown inserted between and attached to the fuel cells 1 in the Drawing. The felts must be electronically conducting and capable of remaining flexible during fuel cell generator operation.

The finished fibrous strips consist essentially of bonded, interlocked, metal fibers selected from the group consisting of flexible, electronically conducting, high-temperatute stable, nickel fibers or cobalt fibers, preferably nickel fibers, where the fibers are coated with a refractory oxide with a melting point over 1500° C. Fibers of refractory oxide, having a melting point over 1500° C. may be included in the strips, for example, aluminum oxide, zirconium oxide or magnesium oxide fibers. Preferred materials are nickel fibers coated with a layer of aluminum oxide (alumina-$Al_2O_3$-m.p. 2030° C.), zirconium oxide (zirconia-$ZrO_2$-m.p. 2700° C.), or magnesium oxide (magnesia -MgO - m.p. 2800° C.) used alone. A major portion of the felt strip, i.e., 70 wt. % to 100 wt. % must contain refractory oxide coated nickel or cobalt fibers. A minor portion of the feltstrip, i.e., up to 30 wt. % can contain the refractory oxide fibers. In all cases, the fiber felt strip must be flexible.

These fibers can range from about 0.38 cm. (0.15 inch) to 1.27 cm. (0.50 inch) long, and have a diameter of from about 0.0013 cm. (0.0005 inch) to 0.25 cm. (0.01 inch). The nickel or cobalt fibers can be made by well known techniques of machining foil, bar stock or wire. Coating thickness can range from about 0.00013 cm.

(0.00005 inch) to 0.0005 cm. (0.0002 inch). Final strip thickness can be in the range of about 0.16 cm. (0.06 inch), but can vary substantially depending on the cell stack design.

In the method of making the porous, electronically conducting, high-temperature stable fibrous strips 7, fibers can be felted or laid down by any appropriate means, in a simple, random, intermingled orientation, or at some specified angle, as shown, for example in U.S. Pats. Nos. 3,895,960 and 3,835,514, rspectively. Intermingled random orientations provide more contact and interlocking between fibers and are preferred. The felt must be about 80% to 98% porous (25 to 20% of theoretical density). The felt will preferably contain all nickel fibers at this point. The body of fibers can be lightly pressed, to bring the fibers in contact with each other and then be diffusion bonded together, preferably in a reducing atmosphere, such as hydrogen gas, at from about 950° C. to about 1200° C., usually at about 1100° C. Diffusion bonding is for a time sufficient to allow interdiffusion of atoms across the fiber interface where the fibers contact, without any melting. Ten minutes is usually sufficient at the higher sinter temperature.

After diffusion bonding the fibers, the bonded fibrous body can be easily handled, having acquiring strength and structural integrity. No fibers should be melted. At this time may be about 0.95 cm. (0.37 inch) thick and still from about 80% to 97% porous. The conductive, bonded fibrous body can then be coated with a refractory oxide, most preferably aluminum oxide, by any suitable means. One such suitable means is to dip the bonded, fibrous body into an aluminum monohydroxide sol, according to the teachings of U.S. Pats. Nos. 3,941,719 and 3,944,658, herein incorporated by reference. The sol would coat all the fibers inthe bonded body. At temperatures of 350° C. to 500° C. the sol would convert to pure amorphous $Al_2O_3$, and at 1200° C. would crystallize to $\alpha$-$Al_2O_3$. The fibers to be coated must be coated after the diffusion bonding step.

This coated fiber structure, either with dried or crystalline alumina could then be cut into the bonded, fibrous strip 7 shown in the Drawing, by any suitable means, for example in a laser machining operation. In the preferred laser machining, the fibers in contact at the cut exterior surface would be found to be free of refractory oxide coating and fibers in contact would be joined together by the action of the laser beam. These oxide free surfaces would be used to make contact with the fuel cell components. The strips would, for the embodiment shown in the Drawing, generally be about 0.64 cm. (0.25 inch) wide by as long as the cell. These bonded, fibrous strips could then, optionally, be lightly coated with a slurry of nickel particles, from about 1 micron to 3 microns diameter, in a carrier, such as polyvinyl alcohol, to improve bonding to the ceramic interconnection and the fuel electrode surface.

These strips could then be placed in contact with the fuel electrode plated or ceramic interconnection surface of the fuel cells, as shown in the Drawing, and compressed to final thickness, to provide cell combinations. The entire cell stack, containing cells and bonded, coated, conductive support felts could then be heated to about 1000° C. to produce a bonded stack configuration. In the heating process the alumina or other refractory will be maintained as a barrier coating between the compacted fibers effective to prevent further metal to metal bonding in the fibrous strips. Throughout operation of the fuel cells, at about 1000° C., the alumina or other refractory will control further metal to metal bonding in the fibrous strips.

We claim:

1. A high-temperature solid electrolyte electrochemical cell configuration, comprising a plurality of elongated electrochemical cells, the cells having inner electrodes and outer electrodes, with solid electrolyte therebetween and being elecronically connected by porous, electronically conductive, fibrous strips, the improvement characterized in that the fibrous strips are from 80% to 95% porous, and comprise flexible, electronically conductive fibers selected from the group consisting of nickel fibers and cobalt fibers bonded together and coated with a refractory oxide, where the fibrous strips electronically connect the inner electrode of one cell to the outer electrode of the next adjacent cell through interconnection material disposed on the inner electrodes, and also electronically connect the outer electrode of one cell to the outer electrode of the next adjacent cell, and where the refractory oxide is effective to prevent additional bonding of fibers during electrochemical cell operation at high temperatures.

2. The high-temperature cell configuration of claim 1, where the fibrous strips consist essentially of fibers selected from the group consisting of: (a) nickel fibers and cobalt fibers bonded together and coated with a refractory oxide having a melting point over 1500° C., and (b) fibers of refractory oxide having a melting point over 1500° C., where from 70 wt. % to 100 wt. % of the fibers are fibers coated with refractory oxide.

3. The high-temperature cell configuration of claim 1, where all of the fibers of the fibrous strips are nickel fibers having a coating of refractory oxide with a melting point over 1500° C.

4. The high-temperature cell configuration of claim 1, where the cells are fuel cells.

5. A flexible, 80% to 98% porous, electronically conducting fibrous body, in elongated strip form, where the fibers in the body are bonded together at their contact points and comprise electronically conducting nickel fibers, where the bonded fibers are coated with a refractory oxide selected from the group consisting of aluminum oxide, zirconium oxide, and magnesium oxide, and where two opposite exterior sides of the fibrous strip are free of oxide.

* * * * *